(12) United States Patent
Sahlberg et al.

(10) Patent No.: US 7,701,446 B2
(45) Date of Patent: *Apr. 20, 2010

(54) METHOD FOR MAKING A PRODUCT

(75) Inventors: Björn Sahlberg, Stockholm (SE); Björn Fransson, Bromma (SE); Johan Gustavsson, Huddinge (SE); Martin Sandström, Sundbyberg (SE); Roger Åström, Stockholm (SE); Jan B. Andersson, Sunny Vale, CA (US); Petter Ericson, Malmö (SE); Danevert Åsbrink, Sundbyberg (SE)

(73) Assignee: Anoto Aktiebolag (Anoto AB), Lund (SE)

( * ) Notice: Subject to any disclaimer, the term of this patent is extended or adjusted under 35 U.S.C. 154(b) by 794 days.

This patent is subject to a terminal disclaimer.

(21) Appl. No.: 11/183,865

(22) Filed: Jul. 19, 2005

(65) Prior Publication Data

US 2005/0253743 A1 Nov. 17, 2005

Related U.S. Application Data

(63) Continuation of application No. 09/941,871, filed on Aug. 30, 2001, now Pat. No. 6,958,747, and a continuation of application No. PCT/SE00/02640, filed on Dec. 22, 2000, and a continuation of application No. PCT/SE00/02641, filed on Dec. 22, 2000, and a continuation of application No. PCT/SE00/02659, filed on Dec. 22, 2000, and a continuation of application No. PCT/SE00/01667, filed on Aug. 30, 2000.

(60) Provisional application No. 60/276,027, filed on Mar. 16, 2001.

(30) Foreign Application Priority Data

Mar. 1, 2001 (SE) .................................... 0100724

(51) Int. Cl.
G09G 5/00 (2006.01)
(52) U.S. Cl. .................................... 345/173; 178/18.01
(58) Field of Classification Search ......... 345/173–179; 178/18.01–18.09; 382/187–189, 209, 217
See application file for complete search history.

(56) References Cited

U.S. PATENT DOCUMENTS 4,835,544 A 5/1989 Winterburn (Continued)

FOREIGN PATENT DOCUMENTS

EP 0615209 A2 9/1994

(Continued)

OTHER PUBLICATIONS

Ny Teknik, vol. 8m "Papper och penna nasta;" Feb. 2001.
"Sand fax, e-post och SMS direkt fran din C-Pen;" Sep. 23, 1999.
XP002328425: Dymetman, Marc and Copperman, Max, "Intelligent Paper" Xerox Research Centre Europe, pp. 392-406, (1998).

Primary Examiner—Regina Liang
(74) Attorney, Agent, or Firm—Birch, Stewart, Kolasch & Birch, LLP

(57) ABSTRACT

A method and a computer program are described for developing a product (110), and services associated with the product, which product has at least one activation area (308) which is provided with a position code (403) that codes at least one position on an imaginary surface (601), which position causes a device (710) that detects the position code (403) to initiate an operation that utilizes information recorded by the device (710). A digital representation of at least part of the product comprising image points is produced, each image point in the digital representation of the activation area (308) corresponding to a position on the imaginary surface (601). A digital template that can be used for making the digital representation of the product is also described.

23 Claims, 9 Drawing Sheets

U.S. PATENT DOCUMENTS

| | | | |
|---|---|---|---|
| 5,051,736 A | 9/1991 | Bennett et al. | |
| 5,063,600 A | 11/1991 | Norwood | |
| 5,194,852 A | 3/1993 | More et al. | |
| 5,245,165 A | 9/1993 | Zhang | |
| 5,442,147 A | 8/1995 | Burns et al. | |
| 5,477,012 A | 12/1995 | Sekendur | |
| 5,486,686 A | 1/1996 | Zdybel, Jr. et al. | |
| 5,625,833 A | 4/1997 | Levine et al. | |
| 5,652,412 A | 7/1997 | Lazzouni et al. | |
| 5,661,506 A | 8/1997 | Lazzouni et al. | |
| 5,842,196 A | 11/1998 | Agarwal et al. | |
| 5,852,434 A | 12/1998 | Sekendur | |
| 5,932,863 A | 8/1999 | Rathus et al. | |
| 6,000,613 A | 12/1999 | Hecht et al. | |
| 6,050,490 A | 4/2000 | Leichner et al. | |
| 6,816,274 B1 * | 11/2004 | Silverbrook et al. | 358/1.15 |
| 6,958,747 B2 * | 10/2005 | Sahlberg et al. | 345/173 |
| 2002/0091711 A1 | 7/2002 | Ericson | |
| 2003/0061188 A1 | 3/2003 | Wiebe et al. | |

FOREIGN PATENT DOCUMENTS

| | | |
|---|---|---|
| EP | 0984390 A2 | 3/2000 |
| GB | 2306669 A | 5/1997 |
| JP | 8-297713 | 11/1996 |
| JP | 10-187907 | 7/1998 |
| JP | 10-257309 A | 9/1998 |
| WO | WO-99/39277 | 8/1999 |
| WO | WO-99/50751 | 10/1999 |
| WO | WO-99/50787 A1 | 10/1999 |
| WO | WO-99/56200 | 11/1999 |
| WO | WO-00/00928 | 1/2000 |
| WO | WO-00/72244 A1 | 11/2000 |
| WO | WO-00/73983 A1 | 12/2000 |
| WO | WO-01/16691 A1 | 3/2001 |
| WO | WO-01/26032 A1 | 4/2001 |
| WO | WO-01/26033 A1 | 4/2001 |
| WO | WO-01/26034 A1 | 4/2001 |
| WO | WO-01/48591 A1 | 7/2001 |
| WO | WO-01/61450 A2 | 8/2001 |

* cited by examiner

METHOD FOR MAKING A PRODUCT

CROSS-REFERENCE TO RELATED APPLICATIONS

This application is a Continuation of co-pending application Ser. No. 09/941,871 filed on Aug. 30, 2001, and for which priority is claimed under 35 U.S.C. §120; and application Ser. No. 09/941,871 is a non-provisional application claiming priority under 35 U.S.C. §119(e) of U.S. Application No. 60/276,027 filed Mar. 16, 2001, claiming priority under 35 U.S.C. §119(a) of Application No. 0100724-4 filed in Sweden on Mar. 1, 2001, and claiming priority under 35 U.S.C. §120 of International Application Nos. PCT/SE00/02640, PCT/SE00/02641 and PCT/SE00/02659 filed on Dec. 22, 2000 and International Application No. PCT/SE00/01667 filed on Aug. 30, 2000; the entire contents of all are hereby incorporated by reference.

FIELD OF THE INVENTION

The present invention relates to a method for making a product that has at least one activation area which is provided with a position code that codes at least one position on an imaginary surface, which position causes a device that detects the position code to initiate a predetermined operation that utilizes the position recorded by the device. The invention also relates to a memory medium with a program which is adapted to carry out the method according to the invention.

BACKGROUND ART

Many people use paper and pen instead of computers for writing short pieces of text, in particular notes from telephone calls and meetings. The reason can be that there is no computer available, that both hands are needed to enter text efficiently via the computer's keyboard, or that it takes a long time to start up the right program in the computer. Even though the notes are written on a sheet of paper, people often also want to enter selected parts of them into a computer, for example a note about a meeting in a digital calendar or an address in a digital address book.

U.S. Pat. No. 5,852,434 and U.S. Pat. No. 5,477,012 show a device that makes it possible for a user to enter handwritten and hand-drawn information into a computer at the same time as the information is being written/drawn on the writing surface. The device comprises a writing surface on which a position code that codes X-Y-coordinates is arranged, and a special pen with a pen point, using which the user can write or draw on the writing surface. The pen also has a light source for illuminating the position code and a CCD sensor for receiving the light that is reflected from the position code. The position information received by the CCD sensor is sent to a computer for processing. This device appears to require a computer to be started up and a particular program to be opened before the user can begin to write on the writing surface.

Similar devices are shown in U.S. Pat. No. 5,661,506, U.S. Pat. No. 5,051,736, U.S. Pat. No. 5,652,412 and U.S. Pat. No. 5,442,147.

U.S. Pat. No. 5,932,863 shows how a user can access an electronic medium by reading off a symbol, code or the like in a printed item, for example a book, by means of a device. The device sends a signal with the read-off symbol to a control unit that executes a command corresponding to the symbol. A similar method is disclosed in WO99/50787.

When making products with a position code and symbols that correspond to a command, it is necessary to have access to a sample product and a pen in order to test the product. However, it is desirable to avoid having to make the entire set of products that is to be produced before testing the product. This is expensive and difficult since a possible defect in the product would imply that the entire set of products would have to be printed once more. It would thus be desirable to have a method for making products according to the invention where this disadvantage is eliminated.

SUMMARY OF THE INVENTION

An object of the present invention is to provide a method and a computer program that simplify the making and testing of products with a position code.

Another object of the present invention is to provide a simplified method for developing products with an activation area with a position code, an operation being associated with the activation area.

These objects are achieved by means of a method and a memory medium according to the independent claims.

Further advantages are achieved by the characteristics in the dependent claims.

According to an aspect of the invention, a method is provided for developing a product that has at least one activation area which is provided with a position code that codes at least one position on an imaginary surface, which position causes a device that detects the position code to initiate an operation that utilizes the position recorded by the device. The method is characterized by the step of producing a digital representation of at least part of the product, which representation comprises image points, each image point in the digital representation of the activation area corresponding to a position on the imaginary surface.

Thus a digital representation of at least part of the product is produced. The part of the product is, for instance, an advertisement in a newspaper, in which case the advertisement does not occupy the entire page. Of course, it is possible for the digital representation to represent the whole page.

In the following, the expression digital representation of a product will be used, when part of the product is intended as well as when the entire product is intended.

The information recorded by the device is advantageously converted into a position which is used to initiate the operation.

There is thus a connection between image points on the display and points on the digital representation of the product. A point on the digital representation of the product is in turn associated with a position on the imaginary surface.

By using a digital representation of the product, the design and testing of the product is made easier. In addition the programming is made easier of an operation that is activated by detecting the position code in an activation area using a device that is adapted to detect the position code.

The position code is so designed that any suitable subset of the position code, which subset has a predetermined size, codes the absolute coordinates for a position on an imaginary surface.

The position code is preferably arranged to be recorded optically, but it is within the scope of the invention that it is arranged to be recorded by, for example, electromagnetic radiation of any suitable wavelength.

The position code is advantageously coded by at least one position sequence with position symbols, which is so arranged that a partial sequence of predetermined length defines unambiguously the location of the partial sequence in the position sequence. This means that each symbol only needs to code a small number of different values. As a result of each symbol only coding a few values, the construction of the symbol is simplified.

Each of the position symbols advantageously contributes to the coding in two orthogonal directions.

Each of the position symbols consists preferably of at least one mark, the location of said at least one mark in relation to a raster defining the value of the symbol.

Alternatively, each of the position symbols can consist of a mark, the size of the mark defining the value of the symbol.

In this connection, by product is meant all possible articles on which a position code can be applied. Primarily this refers to sheets of paper in magazines, books and as loose leafs, but other articles such as noticeboards can also be provided with a position code.

The method according to the invention also comprises advantageously the steps of testing the product by means of marking an image point, converting the image point into a position on the imaginary surface, and initiating the operation by the use of the position.

As there is a connection between image points and positions on the imaginary surface, it is relatively easy to test the operation that is associated with the position code in the activation area. The conversion of the image point into a position means that it is possible to test the operation that is associated with the position without needing to make a physical product. This results in a considerable saving in both time and money.

A method according to the invention advantageously comprises also the steps of entering a digital template with a digital representation of at least one activation area with a position code, and selecting at least one of said activation areas in order to generate the digital representation of the product.

As a template is taken as the base when creating the digital representation of the product, a product for a specific purpose can be made in a simple way. For example, templates are provided by a company that licenses templates. By licensing different templates for different purposes, said company can ensure that a licensee buys a special template for each application.

The template advantageously also comprises a digital representation of a writing surface with a position code, each image point in the digital representation of the writing surface corresponding to a position on the imaginary surface. The writing surface codes a continuous area on the imaginary surface.

The writing surface is included advantageously in all templates that are expected to use an entry field for handwritten information. A user who wants to create a digital representation of a product selects at least part of the writing surface.

The template advantageously also comprises a digital representation of a character-interpretation field with a position code, each image point in the digital representation of the character-interpretation field corresponding to a position on the imaginary surface.

By having fields for character-interpretation in the template, the selection of such fields for the product is made possible. Such fields are, for example, useful if the template is intended for a purpose where, for example, an address or the like, such as an e-mail address, telephone number or fax number, is to be entered. The character-interpretation fields have, advantageously, a position code that is a part of a special area in the imaginary area. This makes it possible for a device that detects the position code to determine straight away that the information entered in the character-interpretation field is to be interpreted as a character.

A method according to the invention advantageously also comprises the steps of showing the digital representation of the product on a display, with several pixels, where each pixel is allocated one or more image points or each image point is allocated one or more pixels, and, when a pixel on the display is marked, converting this into the corresponding image point or image points and converting each image point into a position on the imaginary surface, and initiating the operation by use of the position on the imaginary surface.

This is a simple way to test the product and makes testing possible without it being necessary to make the product.

It is however not essential to have access to all information on the digital representation of the product to be able to test the application. Thus, according to an embodiment of the invention a second digital representation of the product may be used for testing, said second digital representation having information on the activation areas and other areas with a position code and their respective positions in relation to each other, but without any information relating only to the appearance of the product. Thus, for example no color information is included in this second digital representation.

The testing is advantageously carried out using a computer where the digital representation of the product is shown on a display. The method advantageously also comprises the steps of showing the digital representation of the product on a display with several pixels, each pixel being allocated one or more image points or each image point being allocated one or more pixels, and, when a pixel on the display has been marked, converting this into the corresponding image points and converting each image point into a position on the imaginary surface, and initiating the operation by use of the position on the imaginary surface.

The method advantageously also comprises the step of defining and associating an operation with at least one of said activation areas. Thus, for example, programming of a computer is carried out in such a way that the positions of the activation area are associated with a certain operation.

When the digital representation of a product has been tested according to the above description, a test printout of the product is advantageously made on an ordinary sheet of paper using a printer which gives a sufficiently high quality of the printout. The printer must be able to reproduce the position code with sufficient accuracy to allow the position code to be read. The printout which has been made on an ordinary sheet of paper is tested with a reading pen which is adapted to read the position code. Thus, the physical product is tested with the aid of a reading pen and the digital representation of the product. By testing is here meant that different parts of the physical products are recorded by the device, after which the recorded parts are compared with the digital representation of the product. It is not necessary to test the digital representation of the product before making the test printout.

Testing of the product comprises according to an embodiment of the invention the steps of recording an image of a predetermined part of the product, converting the recorded image into a position, and comparing the recorded position with its equivalence in the digital representation of the product.

According to another embodiment, the testing of the product comprises the steps of recording an image of a predetermined part of the product, and determining a size of dots in the image in order to determine a quality of the pattern.

The size of the dots is a measure of the quality of the printing process. If the printing process is not good enough, it will affect the size of the dots in the pattern. If the size of the dots differs too much from the desired size, this may jeopardize the recording and interpretation of the pattern.

Other properties to be tested are density and contrast for the marks as well as the form of the marks.

The printer used for the test printout can thus be of an arbitrary type as long as it produces a printout of sufficiently high quality. The printer is therefore advantageously a laser printer. Alternatively, the printer is an ink jet printer or dye sublimation printer.

The product which is to be sold to consumers is advantageously produced on a large scale, for example, in an ordinary printing press. Advantageously, first only a small amount of products are produced in a first lot, after which the printed products are tested with a reading pen before the rest of the products are printed. This means that the products are tested in the condition in which they are to be sold, and there will be a warning if something has gone wrong. The testing means in this case that it is checked that the position-coding pattern on the printed product corresponds to the digital representation of the product.

The tests used in testing the product that has been printed in a large-scale printing press can be one or more of the testing steps described above. An economically important step is the step of testing a small lot of the printed product since it is in this step that an indication will be obtained whether the completed product is correct or not.

When a user enters positions from a finished product in the form, for example, of a sheet of paper using a device for recording the position code, the device sends signals to a server where the operation is initiated.

Where there is a writing area, it is also possible to define a part of the writing area as an activation area and to associate an operation with the activation area thus defined.

The method advantageously also comprises the steps of sending the digital representation of the product to a printer and of printing it out on the printer.

According to a second aspect of the present invention, a memory medium is provided on which there is stored a computer program for developing a product which has at least one activation area which is provided with a position code that codes at least one position on an imaginary surface, which position causes a device which detects the position code to initiate a predetermined operation that utilizes the position recorded by the device. The memory medium is characterized in that the program, when it is executed on a computer, causes the computer to produce a digital representation of the product, which representation comprises image points, each image point in the digital representation of the activation area corresponding to a position on the imaginary surface.

The program is advantageously arranged, in response to an image point in the digital representation being marked, to generate an output signal comprising information about the position on the imaginary surface that corresponds to the marked image point.

The program is advantageously arranged to enter a digital template with at least one digital representation of an activation area with a position code, to show the template on a display, to receive a signal with information about the choice of at least one of said at least one activation area, and to generate a digital representation of the product using the information signal.

The program is advantageously arranged to receive information for associating an operation with at least one of said at least one activation area.

The program is thus intended for a developer of a product and services connected with the product. According to an embodiment of the program, a user of the program initiates the entering of a template from a network server, for example, connected to the Internet, from which server the user has bought a license to obtain a template using which the user can create a digital representation of a product by selecting different parts of the template. The user can thereafter create different operations and connect them to different activation areas on the digital representation of the product. Finally, the user makes the product, for example by printing a calendar or some other product.

According to another aspect of the present invention, the present invention relates to a method and a computer program for developing a service connected with a product that has at least one activation area which is provided with a position code that codes at least one position on an imaginary surface, which position causes a device which detects the position code to initiate an operation that utilizes the position recorded by the device. The method and the computer program are characterized by the step of showing a digital representation of the product on a display, each image point in the digital representation of the activation area corresponding to a position on the imaginary surface. A computer program and a method according to this aspect of the invention are intended for development of a service connected with the product, the service being advantageously set up on a server with which a user can make contact, for example by means of the above-mentioned device.

According to a further aspect of the present invention, a digital template is provided, which digital template is intended for development of a product that has at least one activation area which is provided with a position code that codes at least one position on an imaginary surface, which position causes a device, that detects the position code, to initiate an operation that utilizes the information recorded by the device. The template comprises image points, each image point in the digital representation of the activation area corresponding to a position on the imaginary surface.

The different characteristics that have been described in connection with the method according to the first aspect above can also be implemented in the memory medium, the method, the computer program and the digital template according to the other aspects of the present invention with the same advantages as mentioned above.

Of course, the different characteristics as described above can be combined in the same embodiment.

In order to illustrate the invention more clearly, detailed embodiments of the invention will be described in the following, however, without the invention being restricted to these.

DESCRIPTION OF PREFERRED EMBODIMENTS

Figure 1:
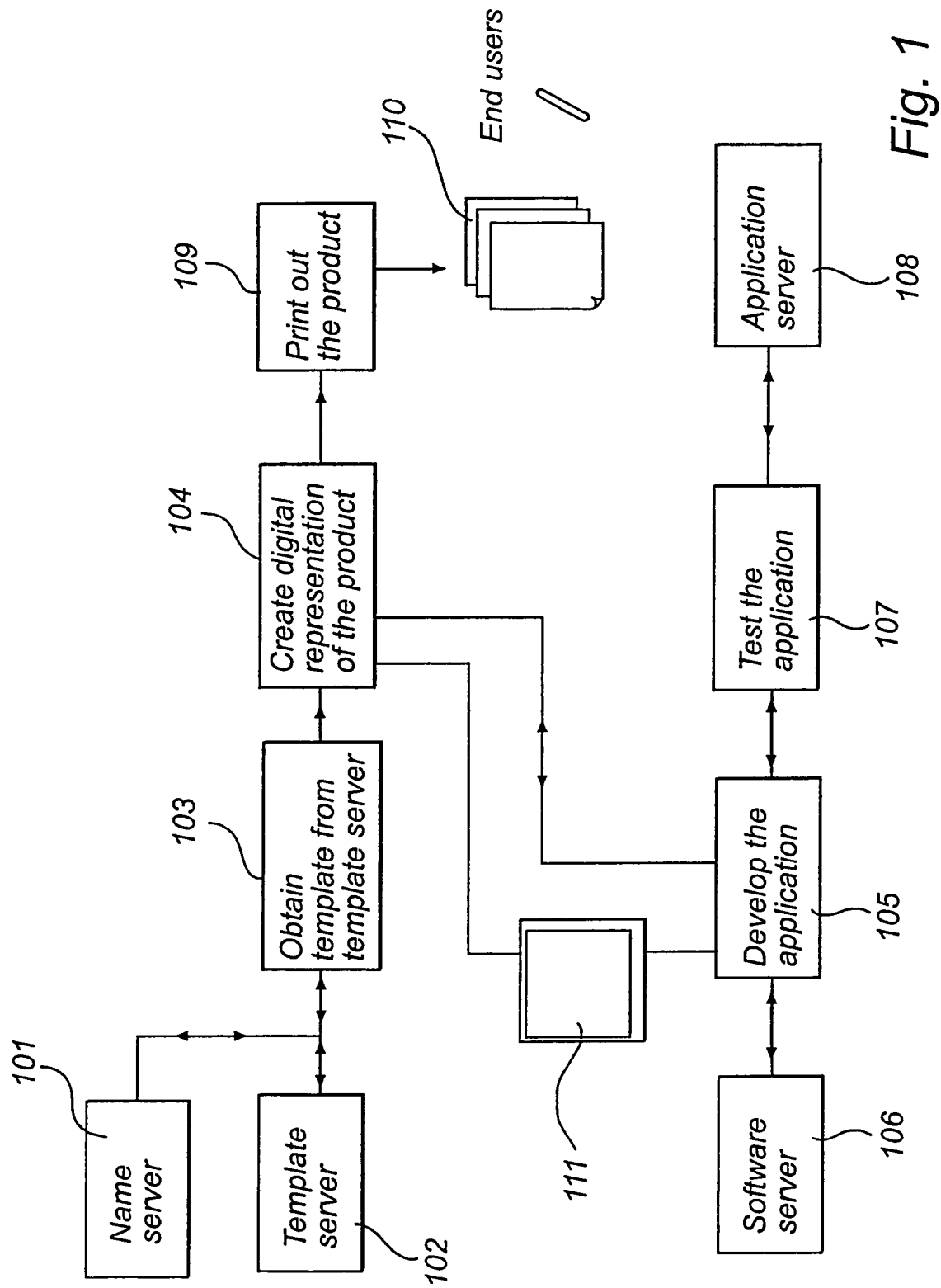
FIG. 1 illustrates the method for generating a product and service according to the invention.
Figure 2:
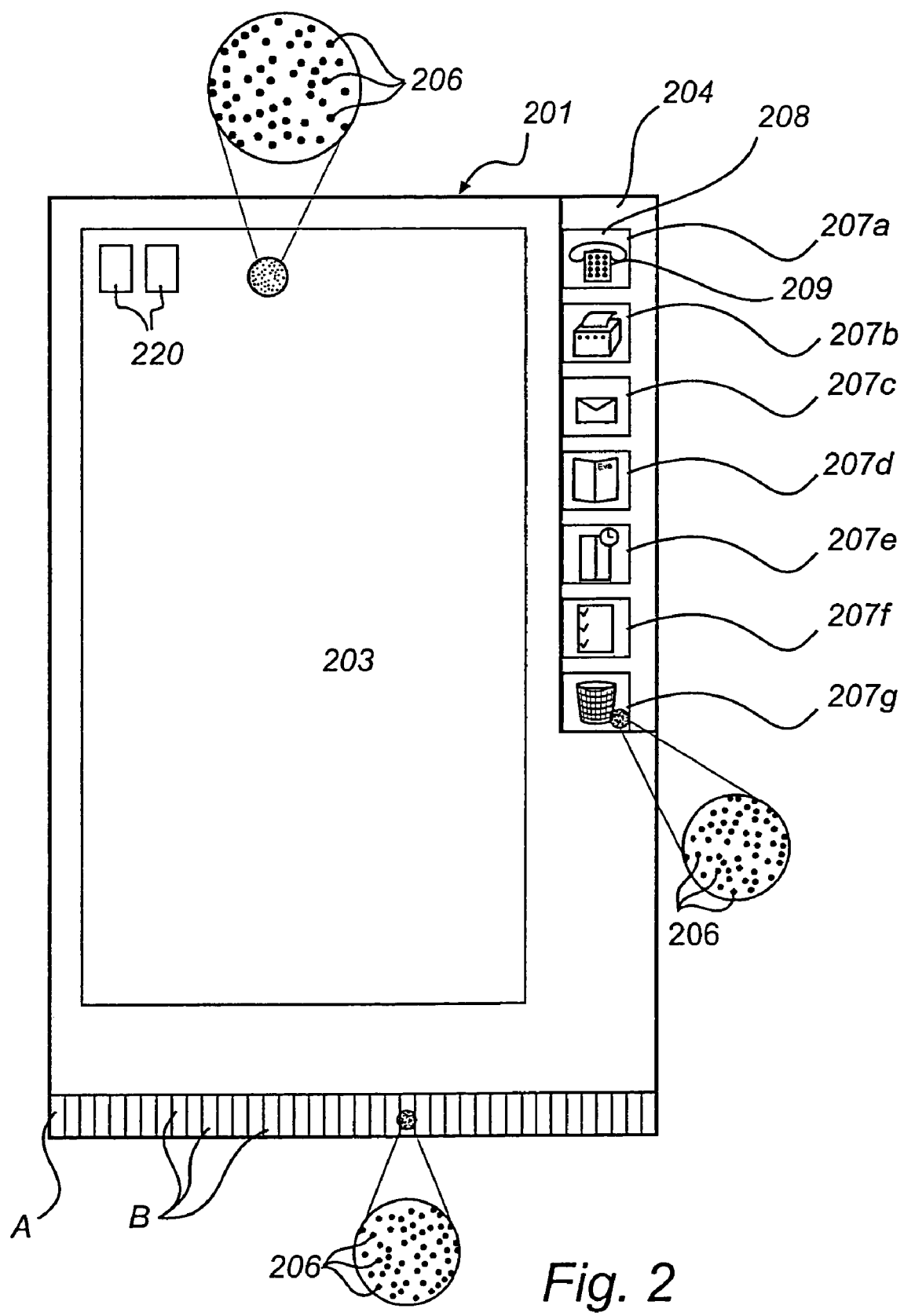
FIG. 2 shows a template for generating a digital representation of a product.

FIG. 1 shows a flowchart for the development of a product and a service according to the invention. A user buys a license to develop and sell a product with a position code that codes at least one position on an imaginary surface. The license is recorded in a name server 101, in which information is stored about the identity of the user and about which positions on the imaginary surface the user has licensed. The information about the user is sent from the name server 101 to a template server 102, from which the user can obtain a template in order to develop his product. In block 103 a template is obtained from the template server 102. FIG. 2 shows the template 201 that the user obtained from the template server 102. The template 201 is intended for the development of a note page. The template comprises a digital representation of a writing surface 203, a digital representation of a command field 204 and a digital representation of a character-interpretation area A. FIG. 1 shows in the upper half the steps that are carried out by someone who is creating the actual product. The lower half of the figure shows the steps that are carried out by someone who is programming a server to carry out a service connected to the product.

It is sufficient for either the persons who are creating the service that is connected to the product or the persons who are creating the product to license the position code.

It is thus possible for there to be different companies creating the service and the product respectively. However, it may be the same company that creates the service as well as the product.

According to the preferred embodiment, the license defines to which positions on the imaginary surface a licensee has access.

The digital representation consists of image points where each image point is allocated a position on the imaginary surface. The image points are reproduced on a screen, each image point in the digital representation corresponding to a pixel on the screen. On screens with low resolution, however, each pixel can be allocated several image points, for example 4, 9 or 16 adjacent image points, while in other cases each image point can be allocated several pixels, for example, in the event of high enlargement of the digital representation on the screen. To mark a track on the screen, for example with a mouse, a number of pixels are marked, and corresponding image points are marked on the digital representation.

On the digital representation of the writing surface 203 there is a position code which is constructed of symbols. Each symbol comprises a mark in the form of a point 206. The location of the point 206 in relation to an imaginary raster that extends over the writing surface determines the value of the symbol. For the sake of clarity, the position code is shown schematically on only a small part of the writing surface and this part of the position code has been enlarged alongside the template. There is an association between image points on the screen and the positions that the corresponding product codes.

The position code will be described in greater detail below.

The position code makes it possible to record graphical information, for example handwritten text and numbers and hand-drawn figures, electronically, at the same time as the graphical information is being written or drawn on the writing surface 203. More particularly, the position is recorded continuously of a pen point, which is writing or drawing the graphical information, by reading off the position code locally at the pen point. In this way, a digital representation of the movement of the pen point across the writing surface is achieved.

In the command field 204 there are seven different digital representations of activation fields 207a-g that can be used to cause a device to initiate and/or carry out various operations. The fields 207a-g comprise on the one hand an activation area 208 that is the area within which a user of the completed product can place a device, such as a reading pen, in order to record the field and in this way initiate an operation, and, on the other hand, a visual indication 209 of the function of the field which is so designed graphically that the user of the product can understand which operation is activated by the field. The visual indications 209 consist in this example of images, but they can also comprise text and/or numbers and/or other symbols. They are further located in the activation areas 208, but they can also be located outside the activation areas but in association with these, if they are not used for the detection and identification of the field.

The fields 207 can interpret a plurality of different activities. An example of a function that can be interpreted by the fields is color adjustment, in which case recording of an image in the color adjusting field means that information that is being entered, has been entered, or both, should then be interpreted as being in the color defined by the color adjusting field.

In the embodiment shown, the activation areas are provided with the same position code as the writing surface, but the position code codes one or more other positions than those that are coded by the position code on the writing surface. The position code is shown schematically on only a small part of one of the activation areas and this part has been enlarged.

Corresponding to each field there is an operation that is to be initiated when the field is "activated", that is, is detected by a device intended for the purpose. The fields in this embodiment are just examples.

The user that designs the digital representation of the product can create, for example, his own activation areas by connecting operations to predefined areas on the writing surface. Said operations may be predefined. These predefined areas are designated 220 in FIG. 2. The device that records the position code recognizes the positions that are in these predefined areas. An advantage of this is that the device reads a continuous position code more easily. The activation areas have the property that the reading pen knows that the application server is to be contacted when the position code in the activation areas is recorded by the pen. Thus, in order to be able to contact the correct application server the reading pen contacts the name server denoted 101 in FIG. 1.

At the bottom of the template there is a character-interpretation field A. This is primarily intended for address information such as fax numbers, telephone numbers or e-mail addresses that are required in association with various operations that are initiated by the activation areas and that need to be character-interpreted, but it can also be used for keywords and other text that needs to be character-interpreted. The character-interpretation field A is visually distinguished from the writing surface so that its extent is obvious to the user. In this embodiment, the area is also divided into sections B, each of which is intended to receive one character. The character-interpretation area is provided with the same position code as the writing surface and the activation areas, but the position code in the address area codes different positions to the position code on the writing surface and the activation areas. The position code is shown schematically on only a small part of the area A. This part has been enlarged.

Figure 3:
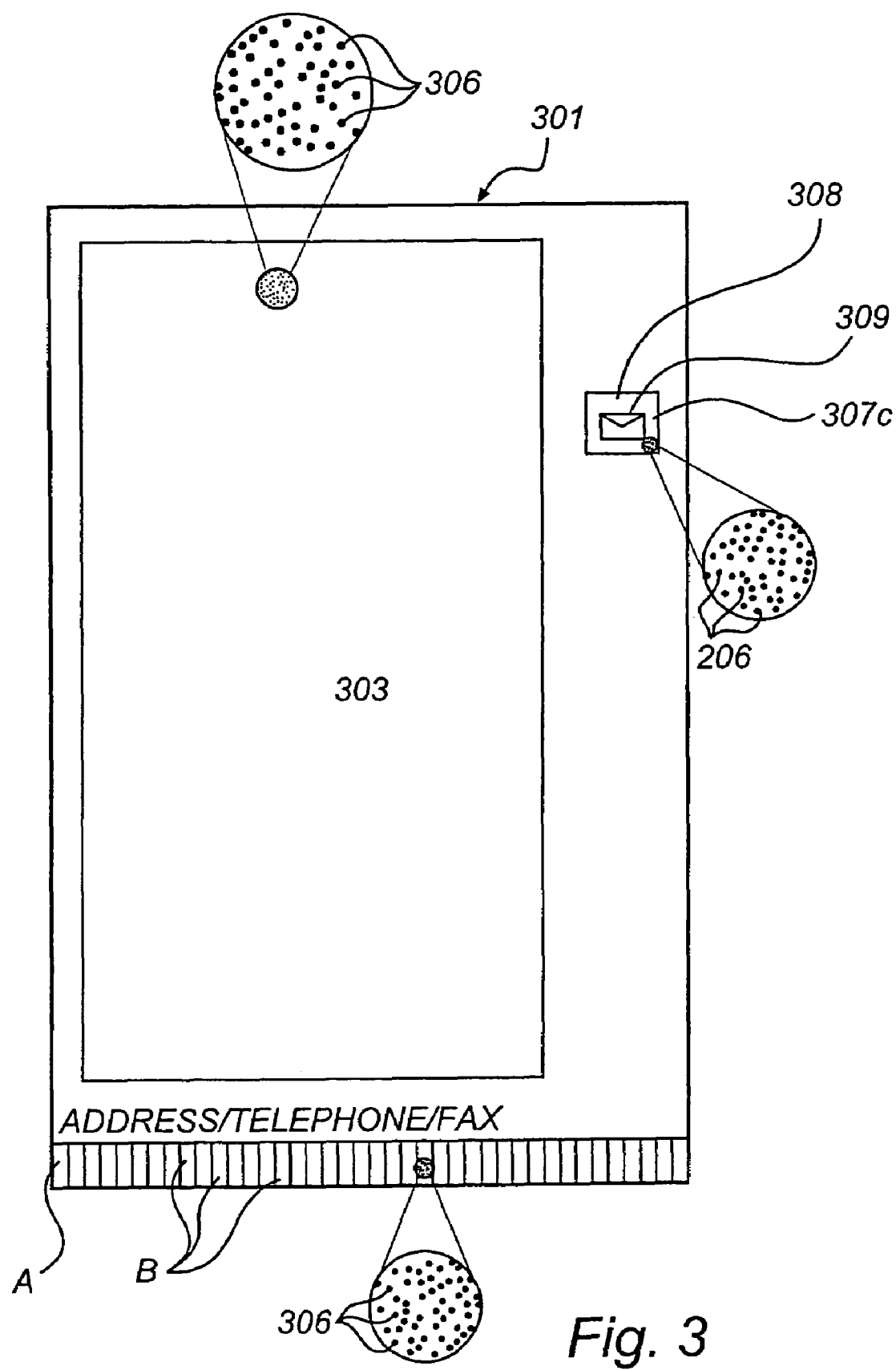
FIG. 3 illustrates a digital representation of a product that was generated based on the template and the corresponding product.

FIG. 3 shows an image of a product in the form of a note page that was generated based on the template in FIG. 2. The note page in FIG. 3 can be regarded as both a product and as a digital representation of a note page and in the following text will be dealt with in both ways. The note page 301 has a writing surface 303 which is provided with a position code which makes it possible to detect positions from the writing surface. The digital representation of the note page 301 has been created by selecting a subset from the template 201. In the flow chart in FIG. 1 this is carried out in block 104. In block 104 the selection of different parts of the template for generation of the digital representation of the product is not just carried out. In block 104 other graphical information is also inserted, such as the text over the character-interpretation field A, which text informs a user that he is expected to write his address and his telephone number in the field. If required, in block 104 colors and other graphical information are also inserted, in order to give the product an attractive appearance. The user sees what the digital representation looks like on the display 111.

After the digital representation of the note page 301 has been created in block 104, it is sent to block 105 for programming of an operation or an application connected to the note page 301.

It is, of course, possible to program the operation/application before creating the graphical appearance of the product. In this case, different areas are associated with the programmed application after the application has been programmed. Thus, according to this embodiment, applications have been programmed before different areas in the digital representation have been associated with the application.

The output signal from block 104 is on the one hand the digital representation of the product that is sent to block 105 and, on the other hand, a digital representation in the form of a printer file that is sent to be printed out in block 109 in order to create the product 110.

For example, the operation/application can be such that it is initiated by a user of the note page recording the position code at the mail symbol 307c. A reading pen that reads off the position code at the mail symbol then recognizes that the positions that are coded by the position code belong to an activation area and accordingly makes contact with the name server 101. The name server sends information to the pen to the effect that it is to contact the application server 108 that is associated with the note page. The application server 108 in turn requests information from the pen according to a preprogrammed program.

The operation/application is thus developed in block 105 by programming what information it requires from a pen that invokes it. In addition, it is possible to program how the operation/application in the application server is to use the data it has obtained from the pen. The application can thereafter be tested using the digital representation of the product, without any product needing to be made.

An example of how the operation/application is tested in block 107 will now be described with reference to FIG. 3. When testing the application, this is carried out using the digital representation of the product 301 that is shown in FIG. 3. When a user writes text, for example using a mouse, in the digital representation of the writing field 303 on the display that shows the digital representation of the product, the different image points that have been written on are converted into positions in the imaginary area that are associated with the digital representation of the product. The different positions are thereafter stored in a memory. As the image points in the digital representation of the activation area 308 are recorded by the pen emulator, the image points are converted into positions, using the points 306 in the position code, that are interpreted as a message to send something to the application which is associated with the position code. In this case, the visual indication 309 is a mail symbol.

In the case with a real product that is sold to consumers, the reading pen sent a request to the name server (PLS), corresponding to 101 in FIG. 1, in order to find out the address of the application server with which the position code that was recorded in the activation area is associated. Thereafter the reading pen sent a signal to the application server in order to initiate a dialogue with the application server. Then the application server specified what information it wanted the reading pen to supply it with. However, each contact with the name server is charged for, for which reason an attempt is made to avoid this when testing the product.

In the case of testing the application in the digital representation of the product, contact with the computer, where the application is being developed, is therefore initiated directly by the pen emulator where the digital representation of the product is being tested. For example, the computer asks for the characters that were written in the character-interpretation field A and interprets the characters as an address. The computer asks for the positions of the image points that were marked in the digital representation of the writing field 303 and also sends the positions to the address that was specified in character-interpretation field A.

All the information of the digital representation of the product is not essential for testing the application with the digital representation of the product. Thus, a second digital representation of the product without any information relating only to the appearance of the product may be used for this testing.

In the case with a real product that is sold to consumers and a real reading pen, the reading pen accesses the address of the application server that asks for the positions for the message that was written on the writing surface, characters that were written in the character-interpretation field and the identity of the reading pen. The application server can thereafter send the message that was written on the writing surface to the address that was written in the character-interpretation field and can debit the user who is associated with the identity of the reading pen.

There can be several different companies that create products that are suitable for a particular service.

Figure 8:
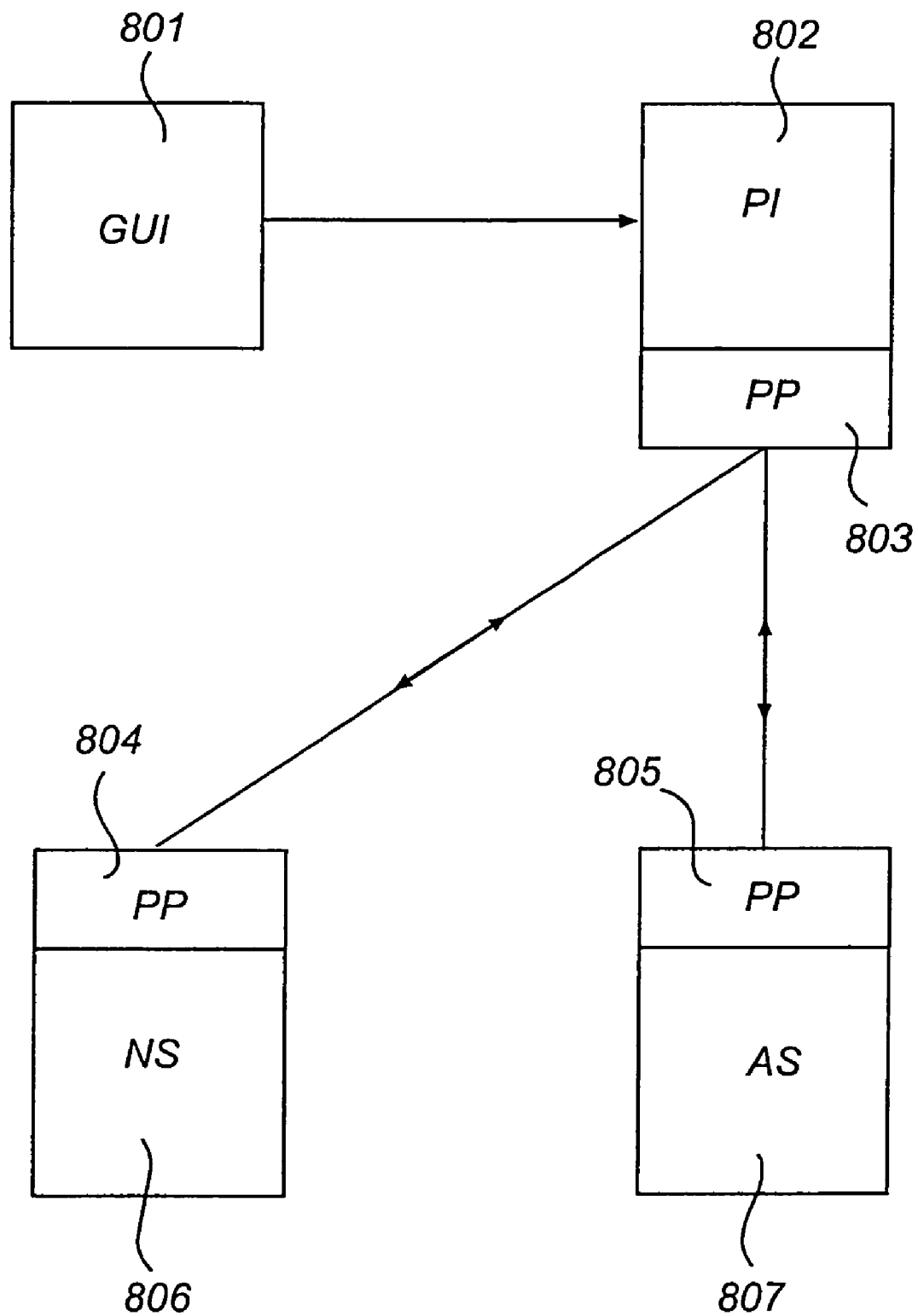
FIG. 8 illustrates a program for testing the digital representation of the product.

A program for developing and testing the digital representation of the product and the corresponding application is illustrated in FIG. 8. The program comprises advantageously a development module that enters a template from the template server and a development module that is adapted to develop the program in the application server. In the development module, different operations are connected to the digital representation of the product so that the application server knows how to process data when it receives a message to the effect that the activation area for "send" has been recorded by a pen. A graphical user interface module 801 is used to test the application. The user interface module 801 has access to the digital representation of the product. As described above in connection with FIG. 3, the marking of image points in the digital representation of the product means that the image points are sent to a pen emulator 802 that converts the image points into a set of positions that processes the positions in the same way as a reading pen. There is connected to the pen emulator a pen protocol module 803 which ensures that the set of positions from the pen emulator are sent out in the same way as from a real pen. In order to test that everything is working as it should, the pen emulator sends the set of positions from the pen emulator to the name server 806 which has a pen protocol module 804 of the same kind for interpreting the information from the pen emulator. The name server 804 gives information to the pen emulator to the effect that it is to contact the application server 807 which is also connected to a pen protocol module in order to interpret the information from the pen emulator. The pen protocol module, the pen emulator and the graphical user interface module are obtained from the software server 106 that is shown in FIG. 1.

As it costs money to place a request with the name server the testing is preferably carried out locally on the computer where the application is being developed. This is done by directly sending the set of positions to the application server 807.

It is possible for a user to obtain the pen protocol module, the pen emulator, the graphical user interface module and all other software on a CD or any type of magnetic storage media.

Figure 9:
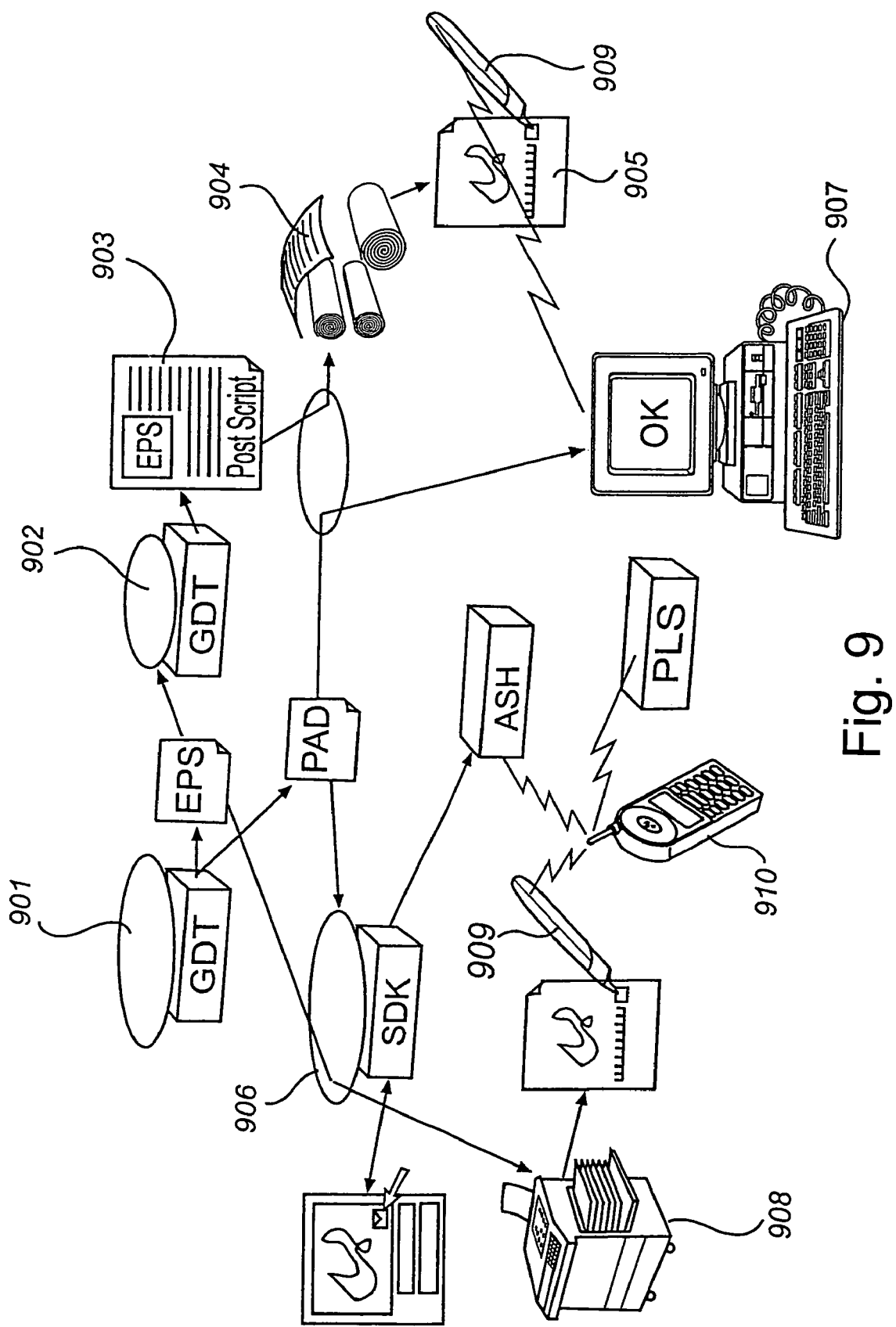
FIG. 9 illustrates the making and testing of a product according to an embodiment of the present invention.

FIG. 9 shows a flow chart of the production and testing of a lot of products according to an alternative embodiment of the present invention. A user makes in step 901 a digital representation (EPS) of part of a product with a first graphical design tool. What is being made in step 901 is the same as in step 104 in FIG. 1. This output signal from the graphical design tool is used as a printout file (EPS) which in a second graphical design tool is attached to a document 903 which is later sent to a printing press 904 for printing a product 905. A second digital representation of the part of the product (PAD) is also sent to a first computer 906 for testing of the digital representation of part of the product and to a second computer 907 for testing of the printed product. The PAD is a version of the EPS without information relating only to the appearance of the product.

Preferably after the testing has proved satisfactory, a test product is printed in an ordinary printer 908 which produces printouts with sufficient accuracy. Preferably, the printer is a laser printer, but is alternatively, some other type of printer that produces printouts of sufficiently high quality, such as a high quality ink jet printer.

The product that has been printed in the printer is then tested with a reading pen in 909 which communicates with an application server (ASH) via a mobile phone 910. The test product is here tested for function. After the test has proved satisfactory, a small amount of products 905 are printed in the printing press 904. Then the products are tested with a reading pen 909 before the entire desired lot of products is printed in the printing press 904.

Figure 10A:
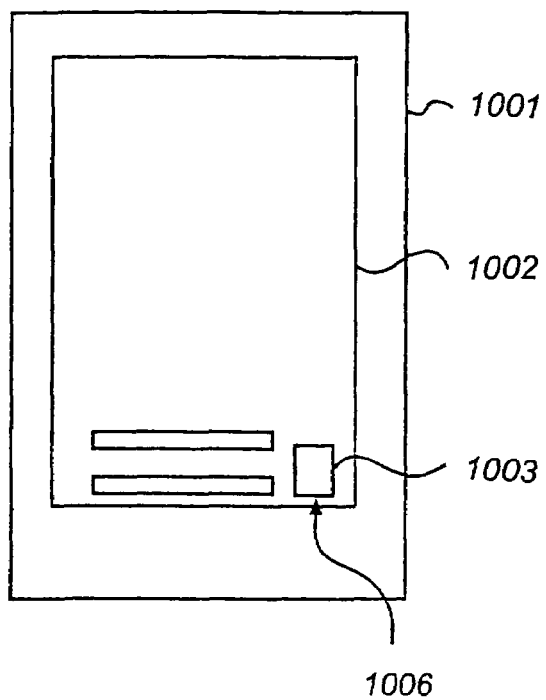
FIG. 10 shows how a product is verified relative to the digital representation of the product.
Figure 10B:
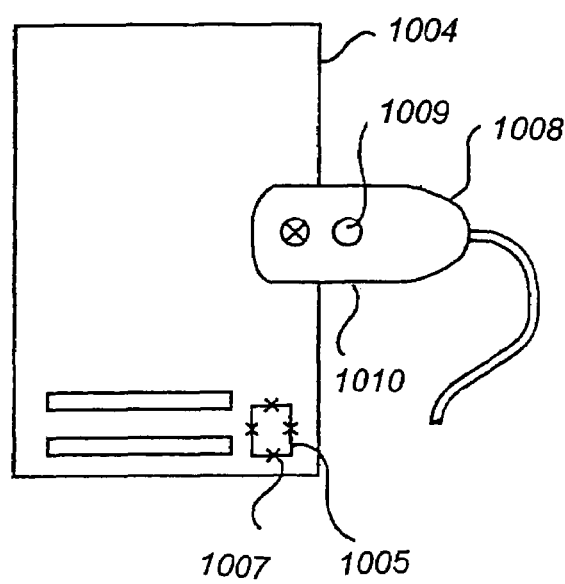

An alternative testing of a product will now be described in more detail with reference to FIG. 10. FIG. 10a shows a display 1001 on which a digital representation 1002 of a product is shown. In the digital representation 1002 of the product, a digital representation of an activation area 1003 is shown. FIG. 10b shows a product 1004 which corresponds to the digital representation 1002 in FIG. 10a. The products 1004 has a field 1005 which corresponds to the digital representation of an activation area 1003. On the digital representation of the product there is not only graphical information but also a position-coding pattern which codes positions on an imaginary surface, as described above. It is of interest to test that the graphics is correctly aligned with the pattern. This is important since the correct part of the position-coding pattern should be marked when an image is recorded in the field 1005. When it is to be tested that the position-coding pattern is correctly aligned with the field 1005, the button 1003 is marked on the display with a cursor 1006. Then images of each of the four edges 1007 of the field 1005 are recorded on the product. This is carried out by means of a testing device 1008 which is provided with a recording button 1009 and a sighting aid 1010, with which it is possible to align the testing device and by means of which it is possible to see which area is to be recorded. When the testing device has been aligned so that the edge of the field 1005 is seen, the recording button 1009 is pressed to record an image of the edge of the field. The recorded images are transformed into positions. Subsequently these positions can be compared with the positions on the marked digital representation of an activation area, which positions are stored in the digital representation of the product. No application server or name server is needed for this testing.

The above-described testing of the product is preferably carried out after printing in a printer. In this way the expensive printing process does not have to be started before a test product has been tested.

A similar testing is preferably performed continuously during the printing in a large scale printing press. This makes it possible to stop the printing process if the quality degrades due to wear of the printing plates.

By testing in several steps, it is possible to interrupt the printing in case of faults, thus saving quite a lot of money for a final user. Particularly the last testing step is important, i.e. when a small test lot of the product is printed since all settings that have been made are then tested the first time.

FIG. 9 shows that the digital representation is only a small part of the product, i.e. an advertisement in the upper corner of a newspaper page.

The position code can be of various types. A possible type of position code where each position is coded by a unique symbol is described in U.S. Pat. No. 5,852,434 mentioned by way of introduction.

In the preferred embodiment of the present invention, however, each position is advantageously coded by means of a plurality of symbols and the coding is such that each symbol in the position code contributes to the coding of more than one position. This means that two adjacent positions have partly shared symbols. In this way, a higher resolution is obtained and the detection is simplified as the individual symbols can be less complex. This type of overlapping or floating position code can be achieved by using a computer. A special way of generating such a floating position code is described in Applicant's previous PCT application No. SE00/01085 which is incorporated herewith by reference.

During recording of images of the product in connection with the testing of the same, a check of other aspects of the pattern, such as the size of marks in the pattern and distances between marks in the pattern, is made according to a preferred embodiment.

Other properties in the printed product that is tested are, for example, form and/or density of the mark. Instead of testing the density, it is possible to check the contrast between the mark and the surrounding area.

The testing of the contrast between the mark and the surrounding area is advantageously carried out at more than one wavelength. For instance, this is carried out at a plurality of wavelengths.

The marks preferably has a simple geometric shape. Thus they are advantageously approximately circular, triangular or rectangular. They can be filled in or not, but the former alternative is preferred since this makes detection easier.

In the case where the marks are circular and of the type described above where the value of the marks depends on their position in relation to a nominal position, the mark should not cover its nominal position and should therefore not have a diameter larger than twice the displacement, i.e. 200%. However, this is not crucial, but a certain overlap can be allowed, e.g. 240%. The smallest size is determined in the first place by the resolution of the sensor and the requirements as regards the printing process to make the pattern. However, the marks should not have a diameter smaller than about 50% of the displacement, in the practical case in order to prevent problems involving particles and noise of the sensor.

In the following, an alternative type of floating position code is described which is the currently most preferred position code. This position code is the object of Applicant's PCT Applications SE00/01895, SE00/01897 and SE00/01898.

A notepad that utilizes a position code is described in Applicant's previous PCT Application SE00/01667 and the corresponding Swedish application 9903051-2 which are hereby incorporated by this reference.

Figure 4:
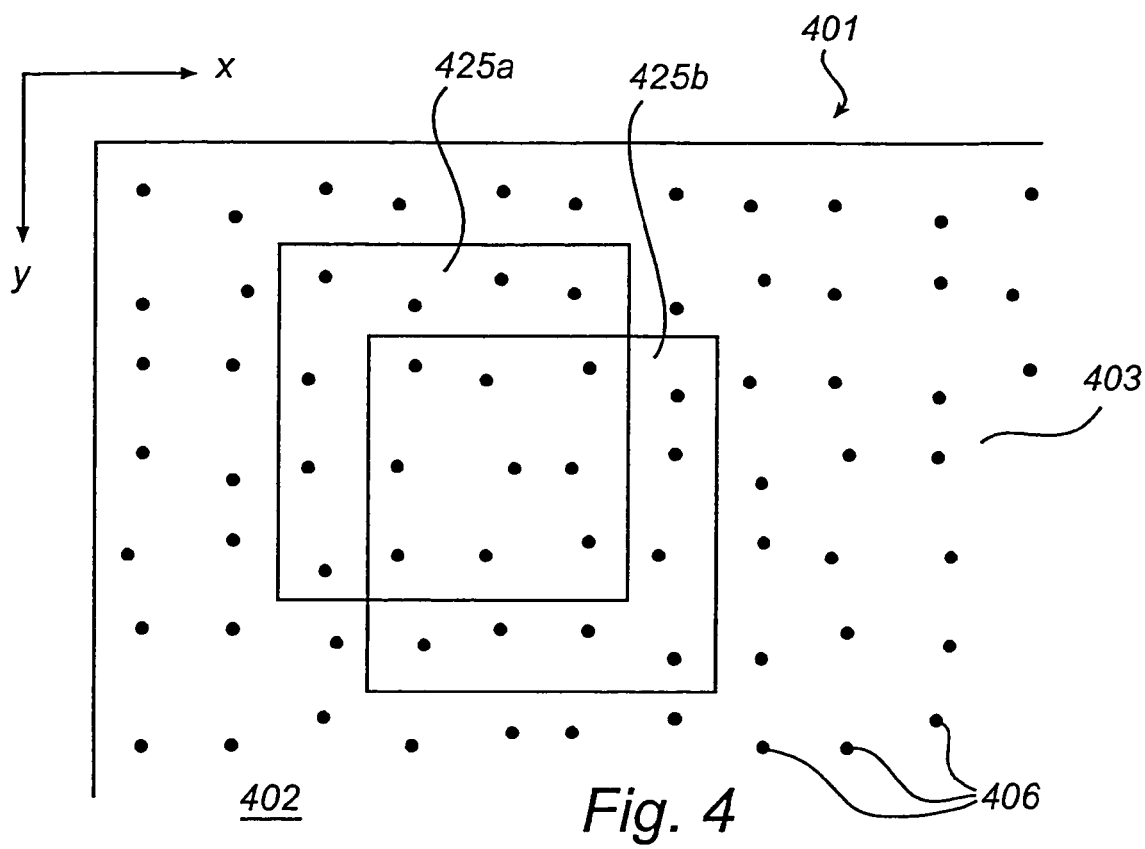
FIG. 4 shows a part of the position code.
Figure 5:
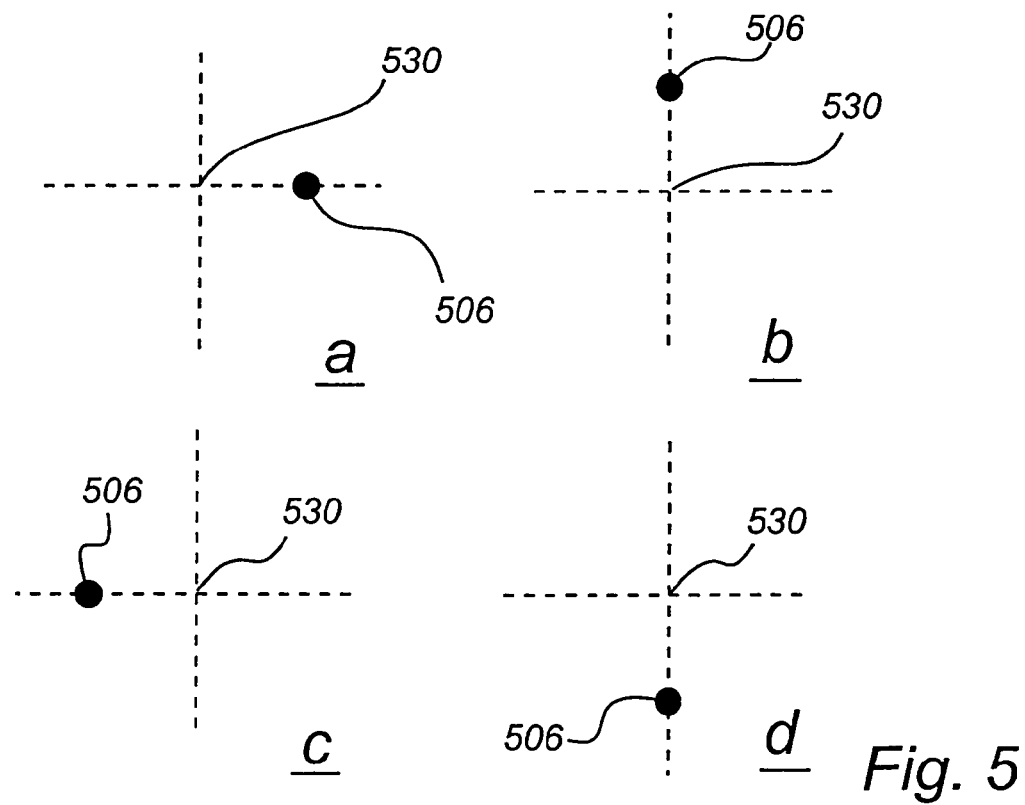
FIG. 5 shows individual symbols in relation to a virtual raster.

FIG. 4 shows an enlarged part of the note page 401 in FIG. 1, which on its surface 402 is provided with the position code 403 with a plurality of symbols 406. The page has an x-coordinate axis and a y-coordinate axis.

The position code comprises a virtual raster, which is thus neither visible to the human eye nor can be detected directly by a device which is to determine positions on the surface, and a plurality of symbols 406, each of which can assume one of the four values "1" to "4" as described below.

The position code is so arranged that the symbols on a partial surface of the page code absolute coordinates for a point on an imaginary surface, as will be described below. A first and a second partial surface 425a, 425b are shown by broken lines in FIG. 4. The part of the position code (here 4×4 symbols) which is situated on the first partial surface 425a codes the coordinates for a first point and the part of the position code which is found on the second partial surface 425b codes the coordinates for a second point on the imaginary surface. The position code is thus partly the same for the adjoining first and second points. Such a position code is called "floating" in this application.

FIGS. 5a-d show an embodiment of a symbol that can be used in the position code. The symbol comprises a virtual raster point 530, which is represented by the intersection between the raster lines, and a mark 506 in the shape of a dot. The value of the symbol depends on where the mark is placed. In the example in FIG. 5 there are four possible locations, one on each of the raster lines extending from the raster points. The displacement from the raster point is the same size for all values. In the following, the symbol in FIG. 5a has the value 1, in FIG. 5b the value 2, in FIG. 5c the value 3 and in FIG. 5d the value 4. Expressed otherwise, there are four different types of symbols.

It should be pointed out that the dots can of course be other shapes.

Each symbol can thus represent four values "1-4". This means that the position code can be divided into a first position code for the x-coordinate, and a second position code for the y-coordinate. The division is carried out as follows:

| Symbol value | x-code | y-code |
|---|---|---|
| 1 | 1 | 1 |
| 2 | 0 | 1 |
| 3 | 1 | 0 |
| 4 | 0 | 0 |

The value of each symbol is thus converted into a first digit, here bit, for the x-code and a second digit, here bit, for the y-code. In this way, two completely independent bit patterns are obtained. The patterns can be combined into a common pattern, which is coded graphically using a plurality of symbols, according to FIG. 5.

Figure 6:
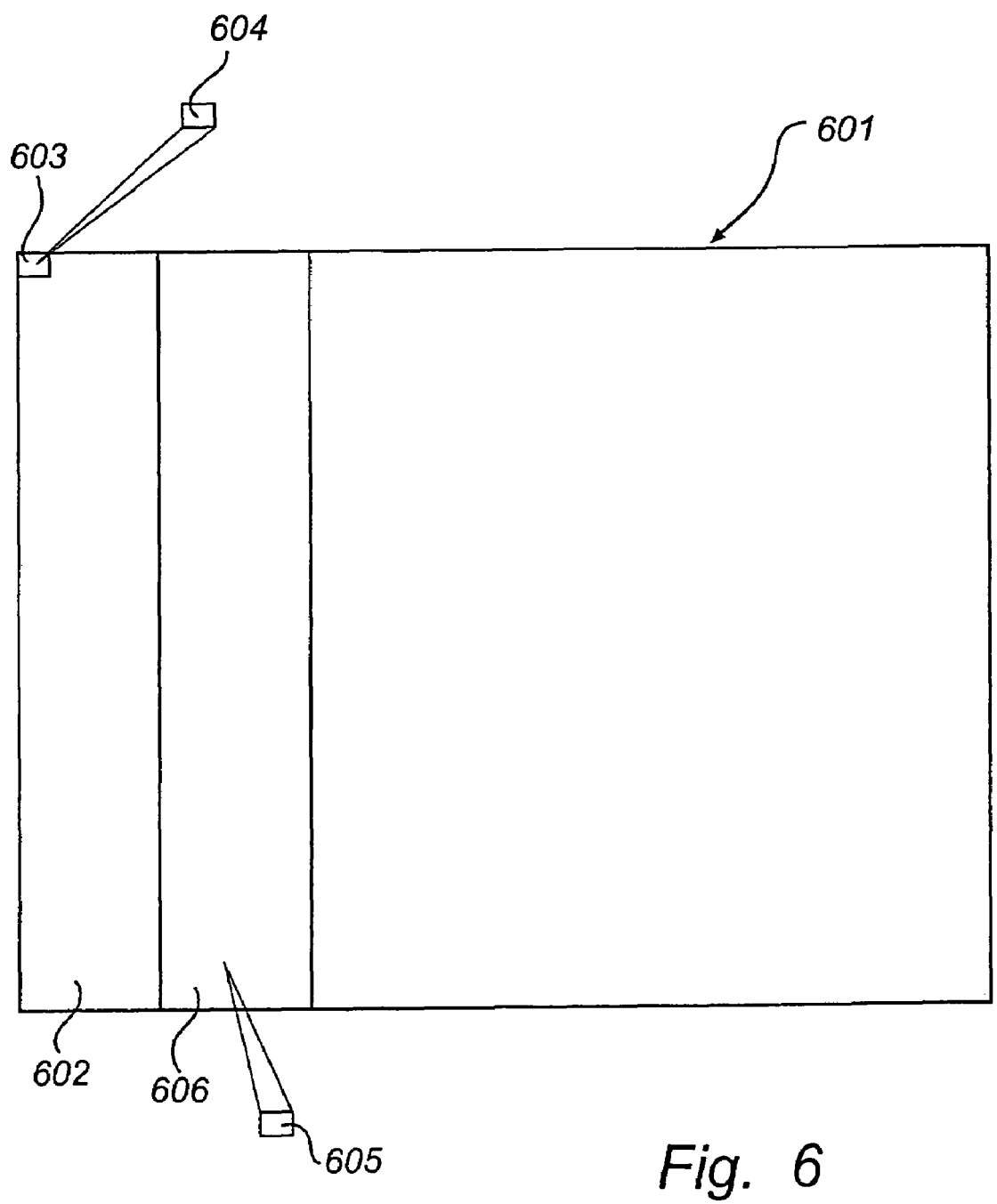
FIG. 6 illustrates the imaginary area within which the position code codes different positions.

FIG. 6 illustrates how different parts of the imaginary surface 601 which is coded by the position code can be used for different purposes. A first partial area 602 is intended for activation areas 208, 308 (FIGS. 2 and 3) and a device which is intended for detecting the position code recognizes the part of the imaginary surface which consists of the first partial area. A second partial area 603 defines activation areas that are associated with sending. A licensee who is going to develop a notepad such as the one shown in FIG. 3 is allocated a subsidiary partial area 604 which is a small part of the second partial area 603. In the same way, a second subsidiary partial area 605 is a part of a third partial area 606 that is associated with text recognition. Thus a device that records a position code that is part of the third partial area 606 can determine directly whether the recorded sequence of positions is to be interpreted as a character.

Figure 7:
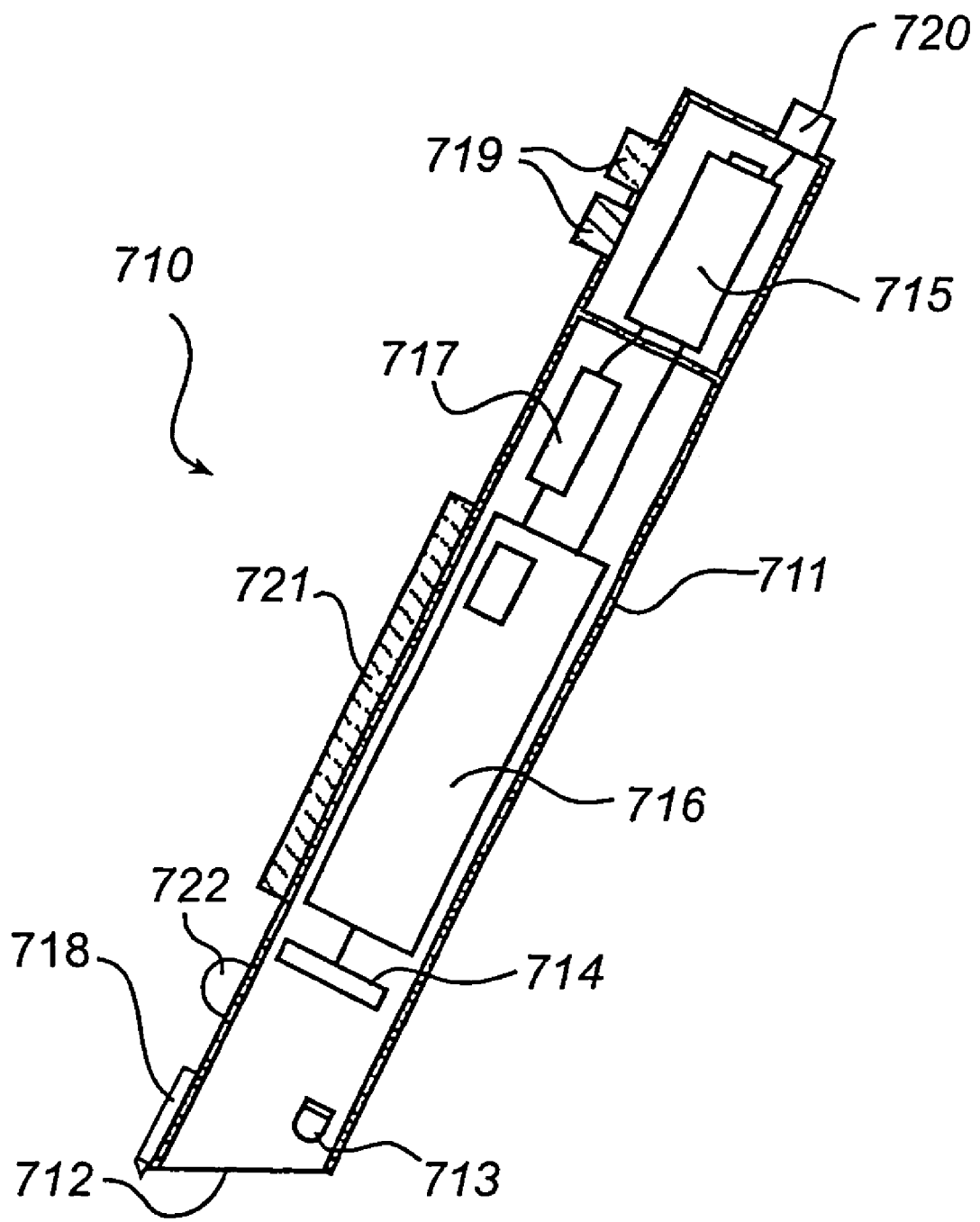
FIG. 7 shows a device for recording the position code.

FIG. 7 shows a reading pen that can be used to record a position code according to the above description.

The device comprises a casing 711 which is approximately the same shape as a pen. In the short side of the casing there is an opening 712. The short side is intended to abut against or to be held a short distance from the writing surface 303, the address area A and the activation fields 307a-307g (cf. FIG. 3).

The casing contains principally an optics part, an electronic circuitry part and a power supply. The optics part comprises at least one infrared light-emitting diode 713 for illuminating the surface which is to be imaged and a light-sensitive area sensor 714, for example a CCD or CMOS sensor, for recording a two-dimensional image. If required, the device can also contain a lens system (not shown).

The power supply for the device is obtained from a battery 715, which is mounted in a separate compartment in the casing.

The electronic circuitry part contains a signal processor 716. The signal processor 716 is realized by means of a suitably programmed microprocessor. It contains software for analyzing images from the sensor to produce a digital representation of the graphical information which is produced on the writing surface and for detecting the activation areas. It further contains software for initiating and/or executing the operations determined by the activation areas. It can also contain user software, such as an address book program to enable the user to keep track of address information, a calendar program to enable the user to keep track of calendar information, such as meetings, birthdays and other information which is written in a diary or calendar, and also a "to do" list program to enable the user to enter tasks to be carried out.

The signal processor 716 also advantageously comprises ICR software which can be used to interpret recorded characters so that they can be stored, managed and/or forwarded in character-coded format.

The signal processor further comprises a memory 717 for storing information that is recorded from the writing surface 703 and the address area A.

On the casing of the device there is in addition a pen point 718, using which the user can write ordinary pigment-based writing on the writing surface. The pen point 718 is extendable and retractable so that the user can control whether or not it is to be used. The pen point is displaced in relation to the sensor 714. Thus the sensor does not detect the exact position of the pen point. However, if so required, this can be calculated from knowledge of the position of the pen point in relation to the sensor.

The device may also comprise buttons 719, by means of which the device can be activated and controlled for operations that are not controlled by the activation fields.

It has also a transceiver 720 for wireless transmission, via a short-range radio link according to, e.g., the Bluetooth standard, of information over short distances. This wireless transmission can be utilized when the device cannot carry out all the initiated operation itself, but needs to pass on the recorded information to an external unit, along with information about which operation is to be carried out. Finally, the device can comprise a display 721 for showing, for example, recorded information. The display is not necessary. To the extent that display is required at all, information can be shown on a display on an external unit.

Of course the invention is not restricted to the embodiments described above and those skilled in the art realize that the invention can be modified within the scope of the appended claims.

For instance, it is not necessary to use an infrared light-emitting diode in the device which is intended to illuminate the product when recording an image, but some other suitable source of light could be used just as well. It is also possible to dispense with the light source of the device and use the surrounding light.

It goes without saying that it is possible to use an ordinary printer to produce the products that are made according to the inventive method. Thus it is not necessary to use printing presses for this purpose.

What we claim and desire to secure by Letters Patent is:

1. A method for developing a tangible product that has at least one code area provided with a position code that codes a set of positions on a reference surface, a position in said set of positions causing a code reader that detects the corresponding position code to initiate a given operation, said method comprising:
   accessing a digital product development template, said digital product development template being associated with a plurality of positions on the reference surface;
   designing a product layout using the digital product development template by selecting at least one subset of the plurality of positions associated with the digital product development template to be encoded in said at least one code area, said product layout including at least one position-coding area and supporting graphics, wherein said at least one position-coding area corresponds to said at least one code area of the tangible product, and said supporting graphics correspond to visual indications on the tangible product; and
   producing a digital representation of at least part of the product layout;
   wherein said position code comprises a plurality of grid points, and a plurality of marks which are located relative to the grid points to encode a grid point value of each grid point; each position in said set of positions being coded by a respective combination of said grid point values; and
   wherein each one of said plurality of grid points is defined by an intersection of at least two grid lines of a virtual grid.

2. The method of claim 1, further comprising: generating the tangible product by means of the digital representation of the product layout.

3. The method of claim 2, further comprising: testing the tangible product by comparing the generated product and the digital representation of the product layout.

4. The method of claim 3, wherein said testing comprises: recording an image of a part of said at least one code area on the generated product; converting the thus-recorded image into a recorded position; and comparing the recorded position with a co-located position in the digital representation of the product layout.

5. The method of claim 1, further comprising: testing the tangible product by means of the digital representation of the product layout.

6. The method of claim 5, wherein said digital representation comprises image points which correspond to positions on the reference surface.

7. The method of claim 6, wherein said testing further comprises: selecting at least one image point within said position-coding area; and deriving a selected position on the reference surface based on the thus-selected image point.

8. The method of claim 7, further comprising: initiating the operation by use of the selected position on the reference surface.

9. The method of claim 6, further comprising: displaying the digital representation on a display, with several pixels, each pixel being representative of at least one image point; and when a pixel is selected, converting the thus-selected pixel into at least one selected image point and deriving a selected position on the reference surface based on the selected image point.

10. The method of claim 9, further comprising: initiating the operation by use of the selected position on the reference surface.

11. The method of claim 1, wherein the digital product development template further defines a plurality of activation areas on the reference surface, each activation area being associated with a predetermined operation to be initiated by the code reader, said designing comprising: selecting at least a portion of an activation area in the digital product development template.

12. The method of claim 1, wherein the digital product development template further defines at least one writing area on the reference surface.

13. The method of claim 12, wherein the writing area is associated with an operation causing the code reader to record positions representing its movement within the writing area.

14. The method of claim 13, wherein the writing area is further associated with an operation causing the code reader to convert the thus-recorded movement to machine characters.

15. The method of claim 12, further comprising: selecting a portion of the writing area; associating an application operation with the thus-selected portion; and providing an instruction set that corresponds to the application operation to an application server which is arranged to communicate with the code reader for receiving positions recorded from the tangible product, wherein a position within the selected portion of the writing area causes the application server to initiate the application operation.

16. The method of claim 15, wherein the application operation operates on positions recorded within the selected portion of the writing area.

17. The method of claim 1, wherein a first and a second position in said set of positions are coded by first and second combinations, respectively, of said grid point values, the second combination containing a portion of the grid points of the first combination.

18. The method of claim 1, wherein information corresponding to the digital product development template is stored in the code reader, so as to associate said position in said set of positions with said given operation.

19. The method of claim 1, further comprising: reproducing the digital product development template on a screen, wherein said product layout is designed based on the thus-reproduced digital product development template.

20. A method for developing a tangible product that has at least one code area provided with a position code that codes a set of positions on a reference surface, a position in said set of positions causing a code reader that detects the corresponding position code to initiate a given operation, said method comprising:

accessing a digital product development template, said digital product development template being associated with a plurality of positions on the reference surface;

designing a product layout using the digital product development template by selecting at least one subset of the plurality of positions associated with the digital product development template to be encoded in said at least one code area, said product layout including at least one position-coding area and supporting graphics, wherein said at least one position-coding area corresponds to said at least one code area of the tangible product, and said supporting graphics correspond to visual indications on the tangible product; and producing a digital representation of at least part of the product layout;

wherein said position code comprises a plurality of grid points, and a plurality of marks which are located relative to the grid points to encode a grid point value of each grid point; each position in said set of positions being coded by a respective combination of said grid point values; and wherein the marks are displaced from the grid points to encode said grid point values; and each one of said plurality of grid points has a single associated mark to encode a grid point value; and wherein each said single associated mark is displaced in one of four predetermined directions from the grid point to encode the grid point value.

21. A device for developing a tangible product provided with a position code that codes at least one position on a reference surface, wherein said position, when detected on the tangible product by a code reader and transmitted to an application program, causes the application program to initiate a predetermined application operation; said device comprising:

an interface module which derives a digital representation of the tangible product, wherein the digital representation comprises image points corresponding to said at least one position on the reference surface;

a displaying module which reproduces the digital representation on a display, with several pixels, each pixel being representative of at least one image point; and an emulator module which, when a pixel is selected on said display, converts the thus-selected pixel into at least one selected image point and derives a selected position on the reference surface based on the selected image point.

22. The device of claim 21, further comprising an output module which provides the selected position to the application program.

23. The device of claim 22, wherein the output module operates according to a code reader communication protocol to mimic said code reader in providing the selected position to the application program.

* * * * *